(12) United States Patent
Allard et al.

(10) Patent No.: US 7,384,989 B2
(45) Date of Patent: Jun. 10, 2008

(54) COATING MATERIAL, METHOD FOR PRODUCTION AND USE THEREOF FOR PRODUCTION OF ADHESIVE, CORROSION-RESISTANT COATINGS

(75) Inventors: Maxime Allard, Münster (DE); Thomas Reher, Münster (DE); Dominique Kauffer, Drensteinfurt (DE)

(73) Assignee: BASF Coatings AG, Munster (DE)

( * ) Notice: Subject to any disclaimer, the term of this patent is extended or adjusted under 35 U.S.C. 154(b) by 379 days.

(21) Appl. No.: 10/533,824

(22) PCT Filed: Nov. 5, 2003

(86) PCT No.: PCT/EP03/12319

§ 371 (c)(1),
(2), (4) Date: May 3, 2005

(87) PCT Pub. No.: WO2004/050776

PCT Pub. Date: Jun. 17, 2004

(65) Prior Publication Data

US 2006/0014865 A1    Jan. 19, 2006

(30) Foreign Application Priority Data

Dec. 3, 2002  (DE) .................. 102 56 265

(51) Int. Cl.
*C08F 2/46* (2006.01)
*C09J 3/28* (2006.01)

(52) U.S. Cl. .................. 522/171; 522/71; 522/74; 522/76; 522/82; 522/85; 522/86; 522/90; 522/84; 522/173; 522/174; 522/178; 522/182; 522/150; 522/152; 522/153; 526/72; 526/274; 526/277; 526/278; 525/287; 525/242; 106/503; 106/400; 106/401; 106/491

(58) Field of Classification Search .................. 526/72, 526/274, 277, 278; 525/287, 242; 106/503, 106/400, 491, 401, 14.05, 14.11, 14.12, 14.41, 106/14.34; 522/71, 74, 76, 81, 82, 84, 85, 522/86, 96, 90, 171, 173, 174, 178, 182, 522/150, 152, 153; 428/364, 369, 371, 480, 428/500

See application file for complete search history.

(56) References Cited

U.S. PATENT DOCUMENTS

| | | | | |
|---|---|---|---|---|
| 4,294,808 A | * | 10/1981 | Wasel-Nielen et al. | 423/305 |
| 4,966,630 A | | 10/1990 | Okuda | 196/426 |
| 5,151,125 A | * | 9/1992 | Kuwajima et al. | 106/503 |
| 5,385,960 A | * | 1/1995 | Emmons et al. | 523/205 |
| 7,268,171 B2 | * | 9/2007 | Tanaka et al. | 522/64 |

FOREIGN PATENT DOCUMENTS

| | | |
|---|---|---|
| EP | 0 389 653 | 1/1989 |
| JP | 1289829 | 11/1989 |
| JP | 8060048 | 3/1996 |

OTHER PUBLICATIONS

JP 01 289829, Database CA Online, Chemical Abstracts Service, Columbus Ohio, US, Kumazaki, et al., Database accession No. 112:160658, XP002268938, Nov. 21, 1989.

JP 08 060048, Database CA Online, Chemical Abstracts Service, Columbus Ohio, US, Tanaka, et al., Database accession No. 125:89302, XP002268937, Mar. 5, 1996.

* cited by examiner

Primary Examiner—Sanza L. McClendon

(57) ABSTRACT

A liquid coating material in the form of a water-in-oil dispersion which is curable with actinic radiation, is substantially or completely free from organic solvents and has a pH<5, comprising (A) at least one constituent selected from the group consisting of low molecular mass, oligomeric, and polymeric organic compounds which contain at least one group which can be activated with actinic radiation, and also air-drying and oxidatively drying alkyd resins, (B) at least one acidic ester of polyphosphoric acid and at least one compound (b1) containing at least one hydroxyl group and at least one group which can be activated with actinic radiation, (C) at least one acidic ester of monophosphoric acid and at least one compound (c1) containing at least one hydroxyl group and at least one group which can be activated with actinic radiation, and (D) at least one acidic, corrosion-inhibiting pigment based on polyphosphoric acid;

process for its preparation, and its use as a coil coating primer.

30 Claims, No Drawings

COATING MATERIAL, METHOD FOR PRODUCTION AND USE THEREOF FOR PRODUCTION OF ADHESIVE, CORROSION-RESISTANT COATINGS

CROSS REFERENCE TO RELATED APPLICATIONS

This application is a National Phase Application of Patent Application PCT/EP 03/012319 filed on 5 Nov. 2003, which claims priority to DE 102 56 265.2, filed on 3 Dec. 2002.

The present invention relates to a novel coating material curable with actinic radiation. The present invention further relates to a novel process for preparing a coating material curable with actinic radiation. The present invention additionally relates to the use of the novel coating material or of the coating material prepared by means of the novel process to produce firmly adhering corrosion-inhibiting coatings, particularly coil coatings, especially primer coats.

In order to produce firmly adhering corrosion-inhibiting coatings on metal strips or coils, particularly those made of the conventional utility metals, such as zinc, aluminum or bright, galvanized, electrolytically zinked, and phosphated steel, by means of the coil coating process (Römpp Lexikon Lacke und Druckfarben, Georg Thieme Verlag, Stuttgart, N.Y., 1998, page 617, "Roller coating", and page 55, "Coil coating") it is necessary to pretreat the surface of the metal coils. As part of the coil coating process, however, this represents an additional step, which it would be desirable to avoid on economic and technical grounds.

As is known, primer coats serve to promote adhesion between the metal surface and the coatings lying above it. To a certain extent they may also contribute to corrosion protection. They are normally produced from pigmented, solventborne, thermally curable coating materials. However, this necessitates complex units for the suction withdrawal and disposal of the emitted solvents, and the coils must be heated to high temperatures (peak metal temperatures, PMT), in order to cure the applied coating materials at the speed which is necessary for the coil coating process. It would be highly desirable to have available solvent-free coating materials rapidly curable with actinic radiation for the production of primer coats.

Pigment-free, solvent-free coating materials (100% systems) curable with actinic radiation are known in principle. However, if these coating materials are pigmented to the high extent which would actually be necessary for sufficient corrosion protection, they become too viscous to be applied without problems, or at all, by means of roller application in the context of the coil coating process. Instead, high application temperatures and/or comparatively complicated extrusion units with slot dies must be employed, both of which are disadvantageous for the coil coating process.

In order to ensure effective protection against white rusting, i.e., the formation of zinc carbonate from zinc oxide and atmospheric carbon dioxide and water, on zinc or zinked surfaces by means of solvent-free radiation-curable coating materials alone, these materials would have to promote the rapid formation of a layer of zinc phosphate on the metal surface. However, this would only be the case at a pH<4.

In that case, however, it would no longer be possible to use the conventional, chromate-free corrosion-inhibiting pigments based on phosphates and silicates, since these pigments are basic and give rise to high viscosity and thixotropic behavior in the coating materials.

The conventional radiation-curable aqueous dispersions, on the other hand, are always neutralized with amines, which promotes white rusting. They have a comparatively low solids content in the range of about 35 to 40% by weight, leading to a particularly high energy requirement for rapid evaporation ("flash-off") of the water. Not least, the resulting coatings remain thermoplastic and are therefore unsuitable as primer coats.

The conventional radiation-curable aqueous dispersions based on oligomers containing acrylate groups, although slightly acidic and with a somewhat higher solids content in the region of about 50% by weight, nevertheless contain a very high amount of surface-active compounds, such as wetting agents and emulsifiers. They reduce the intercoat adhesion and the corrosion protection effect and basically can only be used as additives for increasing the surface reactivity of the pigments and for improving their dispersion.

The conventional radiation-curable dispersions based on polyacrylic acid contain numerous free carboxyl groups and therefore undergo immediate coagulation in acidic aqueous media.

It is an object of the present invention to provide a novel, pigmented coating material which is curable with actinic radiation, substantially or entirely free from organic solvents, and which no longer has the disadvantages of the prior art but instead is easy to prepare, highly reactive and yet stable on storage, particularly easy and unproblematic to apply especially as part of the coil coating process, and which can be cured very rapidly and without emitting volatile organic compounds at low curing temperatures to give coatings, particularly coil coatings, especially primer coatings, which even on unpretreated metal surfaces, particularly the surface of utility metals, such as zinc, aluminum or bright, galvanized, electrolytically zinked, and phosphated steel, have particularly high adhesion, particularly high intercoat adhesion to the overlying coatings, and an outstanding corrosion protection effect, particularly against white rust.

The invention accordingly provides the novel liquid coating material in the form of a water-in-oil dispersion which is curable with actinic radiation, is substantially or completely free from organic solvents and has a pH<5, comprising (A) at least one constituent selected from the group consisting of low molecular mass, oligomeric, and polymeric organic compounds which contain at least one group which can be activated with actinic radiation, and also air-drying and oxidatively drying alkyd resins, (B) at least one acidic ester of polyphosphoric acid and at least one compound (b1) containing at least one hydroxyl group and at least one group which can be activated with actinic radiation, (C) at least one acidic ester of monophosphoric acid and at least one compound (c1) containing at least one hydroxyl group and at least one group which can be activated with actinic radiation, and (D) at least one acidic, corrosion-inhibiting pigment based on polyphosphoric acid.

The novel coating material is referred to below as "coating material of the invention".

The invention further provides the novel process for preparing the coating material of the invention by mixing its constituents and homogenizing the resulting mixture, which involves (1) mixing at least one pigment (D) in a portion of at least one ester (B), at least one ester (C), water, and a portion of the constituent or constituents (A) and grinding the resultant mixture in a milling apparatus to give a pigment dispersion (1), and (2) mixing a further portion of the constituent or constituents (A) and a further portion of at least one ester (C) with one another and homogenizing the resulting mixture to give the makeup mixture (2), (3) then mixing the pigment dispersion (1) and the makeup mixture (2) with one another and homogenizing the resulting mixture to give the coating material (3).

The novel process is referred to below as "process of the invention".

In the light of the prior art it was surprising and unforeseeable for the skilled worker that the object on which the present invention was based could be achieved by means of the coating material of the invention and the process of the invention.

In particular it was surprising that the inventively targeted corrosion protection effect of the coating material of the invention could be achieved by means of pigments (D) which were originally envisaged for completely different purposes of application, such as the curing of waterglass (cf. Th. Staffel, F. Wahl, S. Weber and R. Glaum, "Kälte und Feuchte—na und? Polymere Aluminiumphosphate als Wasserglashärte", Farbe & Lack, Volume 108, Number 10, pages 103 to 109, 2002).

Even more surprising was that the coating material of the invention no longer had the disadvantages of the prior art but instead was easy to prepare, highly reactive and yet stable on storage, was particularly easy and unproblematic to apply especially as part of the coil coating process, and which could be cured very rapidly and without emitting volatile organic compounds at low curing temperatures to give coatings. particularly coil coatings, especially primer coatings, which even on unpretreated metal surfaces, particularly the surface of utility metals, such as zinc, aluminum or bright, galvanized, electrolytically zinked, and phosphated steel, had particularly high adhesion, particularly high intercoat adhesion to the overlying coatings, and an outstanding corrosion protection effect, particularly against white rust.

The coating material of the invention is liquid; that is, although containing solid, nonliquid constituents, it is nevertheless in a fluid state at room temperature under the conventional conditions of preparation, storage and application, and so can be processed by means of the conventional application methods employed in the coil coating process.

The coating material of the invention is in the form of a water-in-oil dispersion, in which the discontinuous aqueous phase is finely dispersed in the continuous organic phase. The diameter of the droplets of the aqueous phase may vary widely; preferably it is from 10 nm to 1000 µm, in particular from 100 nm to 800 µm. The constituents of the coating material of the invention are distributed between the aqueous phase and the organic phase in accordance: with their hydrophilicity or hydrophobicity (cf. Römpp Online, 2002, "Hydrophobicity", "Hydrophilicity"), or are present in the form-of a separate solid phase.

The coating material of the invention or its aqueous phase has a pH<5, preferably <4, and in particular from 3 to 3.5.

The coating material of the invention is substantially or completely free from organic solvents. That is, its organic solvent content is <5%, preferably <3%, and more preferably <1% by weight. In particular the amount is below the detection limits of the conventional qualitative and quantitative detection methods for organic solvents.

The coating material of the invention includes at least one constituent, preferably at least two and in particular at least three constituents, selected from the group consisting of low molecular mass, oligomeric, and polymeric organic compounds which contain at least one, especially one or at least two, group(s) which can be activated with actinic radiation, and also air-drying and oxidatively drying alkyd resins.

By actinic radiation is meant electromagnetic radiation, such as near infrared (NIR), visible light, UV radiation, X-rays or gamma radiation, especially UV radiation, and corpuscular radiation, such as electron beams, alpha radiation, beta radiation, proton radiation or neutron radiation, especially electron beams.

The groups which can be activated with actinic radiation contain at least one, especially one, bond which can be activated with actinic radiation. By this is meant a bond which on exposure to actinic radiation becomes reactive and, with other activated bonds of its kind, enters into polymerization reactions and/or crosslinking reactions which proceed in accordance with free-radical and/or ionic mechanisms. Examples of suitable bonds are carbon-hydrogen single bonds or carbon-carbon, carbon-oxygen, carbon-nitrogen, carbon-phosphorus or carbon-silicon single bonds or double bonds or carbon-carbon triple bonds. Of these, the carbon-carbon double bonds and triple bonds are advantageous and are therefore used with preference in accordance with the invention. The carbon-carbon double bonds are particularly advantageous and so are used with particular preference. For the sake of brevity they are referred to below as "double bonds".

The double bonds are preferably contained in groups of the general formula I:

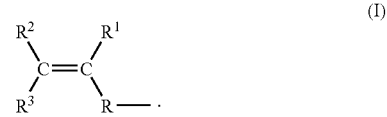

(I)

In the general formula I the variables have the following meanings:

R is a carbon-carbon single bond to the carbon atom of a carbonyloxy group or a divalent organic radical, preferably a carbon-carbon single bond; and $R^1$, $R^2$ and $R^3$ are each a hydrogen atom or an organic radical;

it being possible for at least two of the radicals R, $R^1$, $R^2$, and $R^3$ to be linked cyclically to one another.

Examples of suitable divalent organic radicals R include or consist of alkylene, cycloalkylene and/or arylene groups. Highly suitable alkylene groups include a carbon atom or 2 to 6 carbon atoms. Highly suitable cycloalkylene groups contain 4 to 10, especially 6, carbon atoms. Highly suitable arylene groups contain 6 to 10, especially six, carbon atoms.

Examples of suitable organic radicals $R^1$, $R^2$, and $R^3$ include or consist of alkyl, cycloalkyl and/or aryl groups. Highly suitable alkyl groups contain one carbon atom or 2 to 6 carbon atoms. Highly suitable cycloalkyl groups contain 4 to 10, especially 6, carbon atoms. Highly suitable aryl groups contain 6 to 10, especially 6, carbon atoms.

The organic radicals R, $R^1$, $R^2$, and $R^3$ may be substituted or unsubstituted. However, the substituents must not interfere with the conduct of the process of the invention and/or inhibit the activation of the groups with actinic radiation.

The organic radicals R, $R^1$, $R^2$, and $R^3$ are preferably unsubstituted.

Examples of especially suitable groups of the general formula I are vinyl, 1-methylvinyl, 1-ethylvinyl, propen-1-yl, styryl, cyclohexenyl, endomethylenecyclohexyl, norbornenyl, and dicyclopentadienyl groups, especially vinyl groups.

Accordingly, the particularly preferred groups which can be activated with actinic radiation are (meth)acrylate, ethacrylate, crotonate, cinnamate, cyclohexenecarboxylate, endomethylenecyclohexane-carboxylate, norbornenecarboxylate, and dicyclopenta-dienecarboxylate groups, but especially (meth)acrylate groups.

Examples of highly suitable low molecular mass compounds (A) are conventional reactive diluerits (cf. Römpp Online, 2002, "Reactive diluents"). The reactive diluents are preferably selected from the group consisting of isobornyl acrylate, dicyclopentenyloxyethyl acrylate, N-(2-methacryloyleth-1-yl)ethyleneurea, hydroxybutyl acrylate, hydroxyethyl acrylate, trimethylolpropane triacrylate, ethylene glycol diacrylate, and diethylene glycol diacrylate. In particular, all of said reactive diluents (A) are used.

Oligomeric organic compounds (A) generally contain 2 to 15 monomeric building blocks; polymeric organic compounds (A) generally contain more than 10 monomeric building blocks (cf. also Römpp Online, 2002, "Oligomers", "Polymers").

The oligomeric and polymeric organic compounds (A) may hail from any of a very wide variety of oligomer and polymer classes. Examples of suitable oligomer and polymer classes are random, alternating and/or block, linear and/or branched and/or comb polyaddition resins, polycondensation resins, and addition (co)polymers of ethylenically unsaturated monomers. For further details of these terms refer to Römpp Lexikon Lacke und Druckfarben, Georg Thieme Verlag, Stuttgart, N.Y., 1998, page 457, "Polyaddition" and "Polyaddition resins (polyadducts)", and also pages 463 and 464, "Polycondensates", "Polycondensation", and "Polycondensation resins".

Examples of highly suitable polyaddition resins and/or polycondensation resins (A) are polyesters, alkyds, polyurethanes, polylactones, polycarbohates, polyethers, epoxy resin-amine adducts, polyureas, polyamides, and polyimides.

Examples of highly suitable addition (co)polymers (A) are (meth)acrylate (co)polymers and polyvinyl esters, especially (meth)acrylate (co)polymers.

Particular preference is given to using oligourethanes and polyurethanes (A). These are obtainable from conventional diisocyanates and polyisocyanates and from compounds containing at least one, especially one, isocyanate-reactive functional group and at least one, especially one, of the above-described groups which can be cured with actinic radiation.

Suitable diisocyanates and polyisocyanates include basically all of the conventional aliphatic, cycloaliphatic, aliphatic-dycloaliphatic, aromatic, aliphatic-aromatic and/or cycloaliphatic-aromatic diisocyanates and polyisocyanates and polyisocyanate adducts that are used in the, paints field, which are also referred to as paint polyisocyanates.

Examples of suitable diisocyanates are isophorone diisocyanate (i.e., 5-isocyanato-1-isocyanatomethyl-1,3,3-trimethyl cyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclo-hexane, 5-isocyanato-(4-isocyanatobut-1-yl)-1,3,3-trimethylcyclo-hexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane; 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate, dicyclohexylmethane 4,4'-diisocyanate, liquid dicyclohexylmethane 4,4'-diisocyanate with a trans/trans content of up to 30% by weight, preferably 25% by weight, and in particular 20% by weight, which is obtainable by phosgenating isomer mixtures of bis(4-animocyclohexyl) methane or by fractionally crystallizing commercially customary bis(4-isocyanatocyclohexyl)methane in accordance with patents DE 44 14 032 A1, GB 1220717 A, DE 16 18 795 A1 or DE 17 93 785 A1; trimethylene diisocyanate, tetramethylene diisocyanate, pentamethylene diisocyanate, hexamethylene diisocyanate, ethylethylene diisocyanate, trimethylhexane diisocyanate, heptamethylene diisocyanate or diisocyanates derived from dimer fatty acids as sold under the commercial designation DDI 1410 by Henkel and described in patents WO 97/49745 A and WO 97/49747 A, especially 2-heptyl-3,4-bis(9-isocyanato-nonyl)-1-pentylcyclohexane, 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane, m-tetramethylxylylene diisocyanate (i.e., 1,3-bis(2-isocyanatoprop-2-yl)-benzene, toluylene diisocyanate or diphenylmethane diisocyanate.

Examples of suitable polyisocyanates based on the above-described diisocyanates are isocyanato-containing polyurethane prepolymers prepared by reacting polyols with an excess of at least one of the above-described diisocyanates, and/or polyisocyanates containing isocyanurate, biuret, allophanate, iminooxadiazine-dione, urethane, urea and/or uretdione groups. It is preferred to use polyisocyanates having on average from 2 to 5 isocyanate groups per molecule and viscosities of 100 to 10 000, preferably 100 to 5000, mPas. Moreover, the polyisocyanates may have been subjected to conventional hydrophilic or hydrophobic modification.

Examples of suitable preparation processes are known, for example, from patents CA 2,163,591 A, U.S. Pat. No. 4,419,513, U.S. Pat. No. 4,454,317 A, EP 0 646 608 A, U.S. Pat. No. 4,801,675 A, EP 0 183 976 A1, DE 40 15 155 A1, EP 0 303 150 A1, EP 0 496 208 A1, EP 0 524 500 A1, EP 0 566 037 A1, U.S. Pat. No. 5,258,482 A1, U.S. Pat. No. 5,290,902 A1, EP 0 649 806 A1, DE 42 29 183 A1or EP 0 531-820 A1.

Also suitable are the high-viscosity polyisocyanates described in German patent application DE 198 28 935 A1.

Examples of suitable isocyanate-reactive functional groups are hydroxyl groups, thiol groups, and primary and secondary amino groups, especially hydroxyl groups.

Examples of especially suitable compounds containing an isocyanate-reactive functional group and a group which can be activated with actinic radiation are monomers which carry at least one hydroxyl or amino group per molecule, such as hydroxyalkyl esters of acrylic acid, methacrylic acid or another alpha,beta-olefinically unsaturated carboxylic acid which derive from an alkylene glycol which is esterified with the acid or which are obtainable by reacting the alpha,beta-olefinically unsaturated carboxylic acid with an alkylene oxide such as ethylene oxide or propylene oxide, especially hydroxyalkyl esters of acrylic acid, methacrylic acid, ethacrylic acid, crotonic acid, maleic acid, fumaric acid or itaconic acid, in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; reaction products of cyclic esters; such as epsilon-caprolactone, for example, and these hydroxyalkyl or hydroxycycloalkyl esters;

olefinically unsaturated alcohols such as allyl alcohol;

polyols such as trimethylolpropane monoallyl or diallyl ether or pentaerythritol monoallyl, diallyl or triallyl ether;

reaction products of acrylic acid and/or methacrylic acid with the glycidyl ester of an alpha-branched monocarboxylic acid having 5 to 18 carbon atoms per molecule, especially of a Versatico® acid, or instead of the reaction product an equivalent amount of acrylic and/or methacrylic acid which is then reacted, during or after the polymerization reaction, with the glycidyl ester of an alpha-branched monocarboxylic acid having 5 to 18 carbon atoms per molecule, in particular a Versatic® acid;

aminoethyl acrylate, aminoethyl methacrylate, allylamine or N-methyliminoethyl acrylate; and/or acryloyloxysilane-containing vinyl monomers, preparable by reacting hydroxy-functional silanes with epichlorohydrin and then reacting the reaction product with (meth)acrylic acid and/or hydroxyalkyl and/or hydroxycycloalkyl esters of (meth)acrylic acid and/or further hydroxyl-containing monomers.

In particular, 4-hydroxybutyl acrylate is used.

The reaction of the diisocyanates and polyisocyanates with the compounds having at least one isocyanate-reactive functional group and at least one group which can be activated with actinic radiation has no special features in terms of method but is instead carried out, for example, as described in international patent application WO 96/23836 A.

Air-drying and oxidatively drying alkyd resins (A), such as linseed oil, soybean oil, safflower oil or ricinene alkyd resins, are compounds known per se and are described for example in Römpp Online, 2002, "Alkyd resins". Preferred alkyd resins are those with an oil length or oil content of 20 to 60%, in particular 25 to 60%. 45 to 65 eq. %, in particular 4-8 to 60 eq. %, of the olefinically unsaturated double bonds present in the unsaturated fatty acid residues of the alkyd-resin (A) are conjugated. On account of its oil length or oil content, the alkyd resin is also referred to as a medium-oil alkyd resin.

The unsaturated fatty acid residues of the alkyd resins (A) are derived from unsaturated fatty acids, such as lauroleic acid (dodecenoic acid), myristoleic acid (tetradecenoic acid), palmitoleic acid (hexadecenoic acid), oleic acid (octadecenoic acid), gadoleic acid (eicosenoic acid), erucic acid (docosenoic acid), ricinoleic acid (12-hydroxyoctadecenoic acid), linoleic acid (octadecenoic acid), linolenic acid (octadecatrienoic acid), elaeostearic acid, eicosapentenoic acid or docosahexaenoic acid, which are found in and/or can be obtained from vegetable and animal oils, such as castor oil, dehydrated castor oil, coconut oil, palm oil, groundnut oil, cottonseed oil, soybean oil, safflower oil, sunflower oil, OH sunflower oil, linseed oil, high erucic acid and low erucic acid colza oil, wood oil, oiticica oil, lard, talc, sperm oil, and herring oil.

The unsaturated fatty acids are commercial products and are sold, for example, by UNIQEMA under the brand names Prifac® or Dedico®, by Henkel under the brand name Isomerginsäure® or by Akzo under the brand name Nouracid®.

The amount of fatty acid residues (oil length) and of fatty acid residues containing conjugated double bonds can easily be adjusted by the skilled worker by way of the amount of fatty acids in total and by way of the ratio of olefinically unsaturated fatty acids without conjugated double bonds to olefinically unsaturated fatty acids with conjugated double bonds.

As is known, the alkyd resins (A) are prepared from polyols and polybasic carboxylic acids and the abovementioned oxidatively drying fatty acids.

Examples of suitable polyhydric alcohols are glycerol, pentaerythritol, trimethylolethane, and trimethylolpropane.

Examples of suitable polybasic carboxylic acids are tetrahydrophthalic and hexahydrophthalic acid, methylnadic acid, methylendomethylene- and 3,6-endomethylenetetrahydrophthalic acid, and also the corresponding anhydrides of these acids.

The alkyd resins (A) may also be in modified form, having been modified with at least one modifying component, such as oils, natural resins, phenolic resins, acrylic resins, styrene, epoxy resins, silicone resins or isocyanates.

The alkyd resins (A) are commercial products and are sold, for example, under the brand name Alkydal® R 35 by Bayer AG, Italkyd® R35 by Multi Resin. The alkyd resins (A) are preferably solvent-free in the sense described above or are freed from organic solvents by means, for example, of distillation.

Particularly advantageous coating materials of the invention comprise the above-described reactive diluents (A), the oligomers and polymers (A), and the alkyd resins (A).

The coating material of the invention includes at least one, especially one, acetic ester of polyphosphoric acid and at least one compound (b1) containing at least one, especially one, hydroxyl group and at least one group which can be activated with actinic radiation. Examples of suitable groups which can be activated with actinic radiation are those described above. The diphosphorous pentoxide content of the polyphosphoric acid may vary widely; preferably it is from 60 to 95% by weight, more preferably from 70 to 95% by weight, and in particular from 70 to 90% by weight.

The coating material of the invention further includes at least one, especially one, acetic ester of monophosphoric acid and at least one compound (c1) containing at least one hydroxyl group and at least one group which can be activated with actinic radiation. Examples of suitable groups which can be activated with actinic radiation are those described above.

Highly suitable compounds (b1) and (c1) are selected from the group consisting of carboxylic esters of the general formula II:

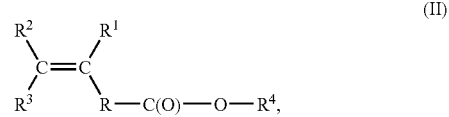

in which the variables R, $R^1$, $R^2$, and $R^3$ are as defined above and the variable $R^4$ stands for a hydroxyl-containing monovalent organic radical.

The monovalent organic radical $R^4$ preferably contains at least one radical which is selected from the group consisting of hydroxyl-containing alkyl, cycloalkyl, and aryl radicals, or consists thereof. It is preferred to use alkyl radicals $R^4$. With particular preference, the hydroxyl-containing alkyl radical $R^4$ is a hydroxyethyl radical, a 2- or 3-hydroxypropyl radical, a 4-hydroxybutyl radical or an omega-hydroxyoligocaprolactyl radical.

Examples of especially suitable compounds (b1) are 4-hydroxybutyl acrylate and oligocaprolactone monoacrylate, preferably with a number-average molecular weight of from 250 to 500. Examples of especially suitable esters (B) of polyphosphoric acid are 4-acryloylbut-1-yl polyphosphate and omega-acryloyloligocaprolacton-1-yl polyphosphate.

Examples of especially suitable compounds (c1) are hydroxypropyl methacrylate and hydroxyethyl methacrylate. Especially suitable esters (C) of monophosphoric acid are 2-methacryloyleth-1-yl phosphate and 3-methacryloylprop-1-yl phosphate. The esters (C) are commercial products which are sold under the brand name Sipomer® by Rhodia as wetting agents or emulsifiers.

The coating material of the invention includes not least at least one, especially one, acidic, corrosion-inhibiting pigment based on polyphosphoric acid. Preference is given to using aluminum and zinc polyphosphates. Aluminum polyphosphates are conventional products and are sold, for example, under the brand name Targon® HS by BK Giulini. Zinc polyphosphates are obtainable from polyphosphoric acid and zinc oxide. They are preferably used in the form of an aqueous suspension.

Furthermore, the coating material of the invention may comprise at least one additive (E), in particular at least two additives (E), in effective amounts.

Additive (E) is preferably selected from the group consisting of polyphosphoric acid, dryers, organic and inorganic, colored and achromatic, optical effect, electrically conductive, magnetically shielding, and fluorescent pigments other than the pigments (D), transparent and opaque, organic and inorganic fillers, nanoparticles, antisetting agents, oligomeric and polymeric binders other than the constituents (A), UV absorbers, light stabilizers, free-radical scavengers, photoinitiators, devolatilizers, slip additives, polymerization inhibitors, defoamers, emulsifiers and wetting agents other than the constituents (C), adhesion promoters, leveling agents, film formation auxiliaries, rheology control additives, and flame retardants.

Particularly advantageous coating materials include polyphosphoric acid, dryers, photoinitiators, nanoparticles, such as, aerosils, as antisettling agents, and emulsifiers and wetting agents other than the constituents (C).

The amount of the above-described constituents in the coating material of the invention may vary widely and is guided by the requirements of the case in hand.

Based on the solids, i.e., the sum of the constituents which make up the coatings produced from the coating material, the coating material of the invention preferably contains 1 to 10%, more preferably 1.5 to 8%, in particular 2 to 6% by weight of organically bonded diphosphorous pentoxide. Based on the solids the coating material of the invention preferably contains 5 to 30%, more preferably 8 to 25%, and in particular 10 to 20% by weight of inorganically bonded diphosphorous pentoxide.

The solids content of the coating material of the invention, based in each case on its total amount, is preferably 70 to 99%, more preferably 75 to 95%, and in particular 70 to 95% by weight. The water content of the coating material of the invention, based in each case on its total amount, is preferably 1 to 30%, more preferably 5 to 25%, and in particular 5 to 30% by weight.

The proportion of pigment (D) to constituent (A) is preferably 1:0.5 to 1:10, more preferably 1:1 to 1:8, and in particular 1:1.5 to 1:6.

Particularly advantageous coating materials of the invention contain, based in each case on their solids, preferably 5 to 35%, more preferably 6 to 30%, and in particular 7 to 25% by weight of an alkyd resin (A), preferably 5to 35%, more preferably 6to 30%, and in particular 7 to 25% by weight of an oligourethane (A), preferably 15 to 40%, more preferably 70 to 35%, in particular 20 to 30% by weight of a mixture of reactive diluents (A), preferably composed of isobornyl acrylate, dicyclopentenyloxyethyl acrylate, N-(2-methacryloyleth-1-yl )ethyleneurea, hydroxybutyl acrylate, hydroxyethyl acrylate, trimethylolpropane triacrylate, ethylene glycol diacrylate, and diethylene glycol diacrylate, preferably 1 to 10%, more preferably 2 to 8%, and in particular 3 to 7% by weight of an ester (B), preferably 0.1 to 3%, more preferably 0.2. to 2%, in particular 0.3 to 1.5% by weight of an ester (C), preferably 5 to 40%, more preferably 6 to 35%, and in particular 7 to 30% by weight of a pigment (D), preferably 0.1 to 3%, more preferably 0.2 to 2%, in particular 0.3 to 1.5% by weight of a non-(C) wetting agent (E), preferably 0.01 to 1%, more preferably 0.02 to 0.8%, and in particular 0.03 to 0.7% by weight of nanoparticles (E), preferably 1 to 10%, more preferably 1.5 to 9%, in particular 2 to 8% by weight of polyphosphoric acid (E), preferably 1 to 10%, more preferably 1.5 to 9%, and in particular 2 to 8% by weight of a photoinitiator (E), and preferably 0.1 to 3%, more preferably 0.2 to 2.5%, and in particular 0.3 to 2% by weight of a dryer (E).

Components (I) and (II) are prepared preferably by mixing the above-described constituents in suitable mixing equipment such as stirred tanks, stirred mills, extruders, kneading apparatus, Ultraturrax, inline dissolvers, static mixers, micromixers, toothed wheel dispersers, pressure release nozzles and/or microfluidizers. It is preferred here to operate in the absence of light with a wavelength λ<550 nm or in complete absence of light, in order to prevent premature crosslinking of component (I) and, where appropriate, of component (II) which can be activated with actinic radiation.

The coating material of the invention is prepared preferably by mixing the above-described constituents in suitable mixing equipment such as stirred tanks, stirred mills, extruders, kneading apparatus, Ultraturrax, inline dissolvers, static mixers, micromixers, toothed wheel dispersers, pressure release nozzles and/or microfluidizers. It is preferred here to operate in the absence of light with a wavelength λ<550 nm or in complete absence of light; in order to prevent premature crosslinking.

For the coating material of the invention it is of advantage if it is prepared by the process of the invention. The process of the invention involves (1) mixing at least one pigment (D) with a portion of at least one ester (B), at least one ester (C), water, and a portion of the constituent or constituents (A) and grinding the resultant mixture in a milling apparatus to give a pigment dispersion (1), and (2) mixing a further portion of the constituent or constituents (A) and a further portion of at least one ester (C) with one another and homogenizing the resulting mixture to give the makeup mixture (2), (3) then mixing the pigment dispersion (1) and the makeup mixture (2) with one another and homogenizing the resulting mixture to give the coating material (3).

For mixing and homogenizing it is possible to use the mixing equipment described above. The pigment dispersion (1) is preferably ground to a Hegman fineness of 1 to 10, preferably 1.5 to 8, and in particular 2 to 4 µm. This can be done using the conventional grinding equipment, such as bead mills and stirred mills.

The pigment dispersion (1) and the makeup mixture (2) are preferably mixed with one another in a proportion of 3:1 to 0.33:1, more preferably 2.5:1 to 1:1, and in particular 2:1 to 1.2:1.

For preparing the pigment dispersion (1) it is preferred as constituents (A) to use at least one of the above-described alkyd resins and at least one, in particular at least two, of the above-described low molecular mass organic compounds.

For preparing the makeup mixture (2) it is preferred as constituents (A) to use at least one of the above-described alkyd resins, at least one, in particular at least two, of the above-described low molecular mass organic compounds, and at least one, especially one, of the above-described oligomeric or polymeric organic compounds.

Furthermore, for preparing the pigment dispersion (1) and the makeup mixture (2) it is possible to use at least one of the above-described additives (E). As additives (E) for preparing the pigment dispersion (1) it is preferred to use at least one, especially one, emulsifier which is different from the ester (C), or at least one, especially one, non-(C) wetting agent, and also at least one, especially one, kind of nanoparticles. As additives (E) for preparing the makeup mixture (2) it is preferred to use polyphosphoric acid, at least one, especially one, photoinitiator, and at least one, especially one, dryer.

In the process of the invention the constituents (A) to (E) are used preferably in amounts such as to give the above-described preferred proportions of the constituents of the coating material of the invention.

The coating materials of the invention are outstandingly suitable for the production of coatings of all kinds. In particular they are suitable as coil coating materials. Moreover, they are outstandingly suitable for producing coatings on all utility metals, in particular on bright steel, galvanized, electrolytically zinked, and phosphated steel, zinc, and aluminum, on coatings, especially primer coatings, and on SMC (sheet molded compounds) and BMC (bulk molded compounds). The coatings of the invention are outstandingly suitable as clearcoats, topcoats, temporary or permanent protective coats, primer coats, sealing coats, and antifingerprint coats, but especially as primer coats.

Surprisingly, the coatings of the invention, especially the primer coatings of the invention even on unpretreated metal surfaces, such as on unpretreated HDG (hot dipped galvanized) steel, meet at least the requirements of class IV of the specification of the company Usinor for components for outdoor use, particularly in terms of adhesion, flexibility, hardness, chemical resistance, intercoat adhesion, and corrosion protection effect, to the full extent.

In terms of method, the application of the coating materials of the invention has no special features but can instead take place by any conventional application method, such as spraying, knifecoating, brushing, flowcoating, dipping, trickling or rolling, for example. Generally speaking it is advisable to operate in the absence of actinic radiation, in order to prevent premature crosslinking of the coating materials of the invention. Following application, the water contained in the coating material of the invention can be evaporated in a simple manner, this also being referred to as flash-off. This is preferably done by the brief inductive heating of the metal substrates.

Radiation sources suitable for curing the applied coating materials of the invention with actinic radiation include sources such as high or low pressure mercury vapor lamps or electron beam sources. Further examples of suitable methods and apparatus for curing with actinic radiation are described in German patent application DE 198 18 735 A1, column 10 line 31 to column 11 line 22, by R. Stephen Davidson in "Exploring the Science, Technology and Applications of U.V. and E.B. Curing", Sita Technology Ltd., London, 1999, Chapter I, "An Overview", page 16, FIG. 10, or by Dipl.-Ing. Peter Klamann in "eltosch System-Kompetenz, UV-Technik, Leitfaden für Anwender", page 2, October 1998.

For irradiation it is preferred to use a radiation dose from 100 to 6000 mJ cm$^{-2}$, preferably 200 to 3000, more preferably 300 to 2500, and with particular preference 500 to 2000 mJ cm$^{-2}$.

The radiation intensity may vary widely. It is guided in particular by the radiation dose on the one hand and the irradiation time on the other. For a given radiation dose, the irradiation time is guided by the belt speed or speed of advance of the substrates in the irradiation unit and vice versa. The radiation intensity is preferably $1 \times 10^0$ to $3 \times 10^5$, more preferably $2 \times 10^0$ to $2 \times 10^5$, with particular preference $3 \times 10^0$ to $2.5 \times 10^5$, and in particular $5 \times 10^0$ to $2 \times 10^5$ W m$^{-2}$.

It is a particular advantage of the coating material of the invention that the radiation cure can be assisted by oxidative curing in air. It is a further particular advantage of the coating material of the invention that it can also be cured only partly and in this state can be overcoated with at least one further coating material, in particular with a coating material curable with actinic radiation, after which all applied films can be cured together using actinic radiation. By this means the process times are shortened further, and the intercoat adhesion is further improved. Overall, owing to the use of the coating material of the invention, it is no longer necessary in the coil coating process to heat the metal sheets to PMTs of 240° C. or more. Also unnecessary is the suction withdrawal and disposal of volatile organic compounds, so allowing the expenditure in terms of apparatus, safety technology, and energy to be reduced significantly.

The resulting coatings of the invention are highly flexible, very highly deformable without damage, resistant to chemicals, stable to weathering, resistant to condensation and salt water, and of high adhesion to the substrates and to other coatings. They combine all of these features with an outstanding visual appearance.

EXAMPLES

Example 1

The Preparation of the Coating Material 1

For the preparation of the coating material 1, a mixture is first prepared from 18.9 parts by weight of an alkyd resin with an oil length of 28%, a mass-average molecular weight of 10 000 to 12 000 daltons, and a molecular weight polydispersity <5, based on hexahydrophthalic acid and modified sunflower oil FA aving a conjugated double bond fraction of from 48 to 62 eq. %, based on the number of double bonds present (Edenor® 6010 from Henkel), 12.6 parts by weight of isobornyl acrylate, 2 parts by weight of dicyclopentenyloxyethyl acrylate, 9 parts by weight of a polyphosphoric ester of 4-hydroxybutyl acrylate (prepared by reacting 80 parts by weight of 4-hydroxybutyl acrylate and 20 parts by weight of polyphosphoric acid with a diphosphorous pentoxide content of 84% by weight; excess of 4-hydroxybutyl acrylate: 20% by weight), 17.5 parts by weight of deionized water, 7 parts by weight of Laromer® PE 55 WN (monomer mixture of trimethylolpropane triacrylate, ethylene glycol diacrylate, 2-hydroxyethyl acrylate and diethylene glycol diacrylate, 50 percent strength in water, from BASF Aktiengesellschaft), 1.5 parts by weight of Rheolate® 2001 (commercial wetting agent from Elementis), 2 parts by weight of 3-methacrylbylprop-1-yl phosphate (Sipomer® DV 6661, commercial wetting agent from Rhodia) and Aerosil® 200 (commercial anti-settling agent from Degussa). The mixture was homogenized in an Ultraturrax at a rotary speed of 1800 for 20 minutes.

30 parts by weight of an aluminum polyphosphate (Targon® HS from BK Giulini) were added to the mixture.

The resulting pigment dispersion was ground in a bead mill to a Hegman fineness of from 2 to 4 µm.

In parallel, a makeup mixture was prepared from 7.2 parts by weight of the above-described alkyd resin, 4.8 parts by weight of isobornyl acrylate, 35 parts by weight of the above-described polyphosphoric ester of 4-hydroxybutyl acrylate, 5.5 parts by weight of polyphosphoric acid (diphosphorous pentoxide content: 84% by weight), 28 parts by weight of an oligourethane prepared from a modified polyisocyanate prepolymer based on diphenylmethane diisocyanate (Desmodur® 2010 from Bayer AG) and 4-hydroxybutyl acrylate, 12 parts by weight of dicyclopentenyloxyethyl acrylate, 5.5 parts by weight of Irgacure® 184 (commercial photoinitiator from Ciba Specialty Chemicals), 1.25 parts by weight of cobalt octoate, and 2.5 parts by weight of N-(2-methacryloyleth-1-yl)ethyleneurea.

62.5 parts by weight of the pigment dispersion were mixed with 37.5 parts by weight of the makeup mixture, after which the resulting coating material 1 was homogenized.

The coating material 1 had a solids content of 85% by weight, a pigment/binder ratio of 1:3, a pH of 3, organically bonded diphosphorous pentoxide in an amount of 4% by weight, based on the solids, and inorganically bonded disphosphorous pentoxide in an amount of 17% by weight, based on the solids. The coating material 1 was fully stable on storage in the absence of actinic radiation for at least one month. It was outstandingly suitable for the production of primer coatings.

Example 2

The Preparation of the Coating Material 2

Example 1 was repeated but using
9 parts by weight instead of 17.5 parts by weight of deionized water and
40 parts by weight of zinc polyphosphate (75% by weight in water) instead of 30 parts by weight of aluminum polyphosphate.

The coating material 2 likewise had a solids content of 85% by weight, a pigment/binder ratio of 1:3, a pH of 3, organically bonded diphosphorous pentoxide in an amount of 4% by weight, based on the solids, and inorganically bonded disphosphorous pentoxide in an amount of 17% by weight, based on the solids. The coating material 2 was fully stable on storage in the absence of actinic radiation for at least one month. It was outstandingly suitable for the production of primer coatings.

Examples 3 to 8

The Production of Primer Coatings Using the Coating Material 1 as per Example 1

The substrates used were unpretreated HDG (hot dipped galvanized) steel panels from Chemetall.

In the case of Example 3, coating material 1 was applied in a film thickness of 4 to 6 µm. The water contained therein was evaporated at 80° C. over one minute. The resulting film was cured with UV radiation in a dose of 1000 mJ cm$^{-2}$.

In the case of Example 4, coating material 1 was applied in a film thickness of 1 to 2 µm. The water contained therein was evaporated at 80° C. over one minute. The resulting film was partially cured with UV radiation in a dose of 300 mJ cm$^{-2}$. The part-cured film was coated with coating material 1 in a film thickness of 4 to 6 µm. The water contained therein was likewise evaporated at 80° C. over one minute. The two films were then fully cured with radiation in a dose of 1000 mJ cm$^{-2}$.

In the case of Example 5, coating material 1 was applied in a film thickness of 1 to 2 µm. The water contained therein was evaporated at 80° C. over one minute. The resulting film was partially cured with UV radiation in a dose of 300 mJ cm$^{-2}$. The part-cured film was coated with a commercial, solvent-free, UV-curable clearcoat material of series CD 97 from BASF Coatings AG in a film thickness of 4 to 5 µm. The two films were then fully cured with UV radiation in a dose of 1000 mJ cm$^{-2}$.

All of the coatings of Examples 3 to 5 exhibited an outstanding overall appearance.

For Examples 6 to 8, the coatings of Examples 3 to 5 were coated with a commercial solventborne coil coating topcoat material of series CD 27 from BASF Coatings AG. The topcoat films were cured thermally.

The coated sample panels of Examples 3 to 8 were scribed and subjected to the salt spray test. After 168 hours the sample panels of Examples 3 to 5 still showed no adverse changes whatsoever, such as white rusting or delamination. After 504 hours, the sample panels of Examples 6 to 8 also still showed no adverse changes, such as white rusting or delamination. This underscored the fact that the primary coatings had an outstanding corrosion protection effect.

All of the coatings of Examples 3 to 7 could be deformed without problems and without damage (T-bend test: T1-1.5). The deformability of the coating of Example 8 was even better (T-bend test: T0-0.5).

The coatings of Examples 3 to 7 met the requirements of class IV of the specification of the company Usinor for components for outdoor use; the coating of Example 8 even met the requirements of the class VI specification.

Examples 9 to 14

The Production of Primer Coatings Using the Coating Material 2 as per Example 2

For Examples 9 to 14, Examples 3 to 8 were repeated but using the coating material 2 as per Example 2 instead of the coating material 1 as per Example 1. The results obtained were the same outstanding results as in the case of Examples 3 to 8.

What is claimed is:

1. A liquid coating material in the form of a water-in-oil dispersion which is cured with actinic radiation, is substantially or completely free from organic solvents and has a pH<5, comprising
   (A) at least one constituent selected from the group consisting of low molecular mass organic compounds containing at east one group which can be activated with actinic radiation, oligomeric organic compounds containing at least one group which can be activated with actinic radiation, polymeric organic compounds containing at least one group which can be activated with actinic radiation, air-drying alkyd resins, and oxidatively drying alkyd resins,
   (B) at least one acidic ester comprising the reaction product of polyphosphoric acid and at least one compound (b1) containing at least one hydroxyl group and at least one group which can be activated with actinic radiation,
   (C) at least one acidic ester comprising the reaction product of monophosphoric acid and at least one compound (c1) containing at least one hydroxyl group and at least one group which can be activated with actinic radiation, and
   (D) at least one acidic, corrosion-inhibiting pigment based on polyphosphoric acid.

2. The coating material of claim 1, containing, based on the solids, 1 to 10% by weight of organically bonded $P_2O_5$.

3. The coating material of claim 1, containing, based on the solids, 5 to 30% by weight of inorganically bonded $P_2O_5$.

4. The coating material of claim 1, wherein the proportion of pigment (D) to constituent (A) is 1:0.5 to 1:10.

5. The coating material of claim 1, having a solids content of 70 to 99% by weight.

6. The coating material of claim 1, wherein the pigment (D) is selected from the group consisting of acidic aluminum polyphosphates and zinc polyphosphates.

7. The coating material of claim 1, wherein the low molecular mass organic compound (A) is a reactive diluent.

8. The coating material of claim 1 wherein the oligomeric or polymeric compound (A) is an oligourethane or polyurethane.

9. The coating material of claim 1, wherein the air-drying and oxidatively drying alkyd resin (A) has an oil length of 20 to 60%, based on the alkyd resin (A), 45 to 65 eq. % of the olefinically unsaturated double bonds present in the unsaturated fatty acid residues being conjugated.

10. The coating material of claim 1, wherein the group which can be activated with actinic radiation contains at least one bond which can be activated with actinic radiation.

11. The coating material of claim 10, wherein the actinic radiation is electromagnetic radiation or corpuscular radiation.

12. A coating material of claim 11, wherein the electromagnetic radiation embraces near infrared (NIR), visible light, UV radiation, X-rays, and gamma radiation and the corpuscular radiation embraces electron beams, proton radiation, alpha radiation, beta radiation, and neutron radiation.

13. The coating material of claim 1, wherein the bond which can be activated with actinic radiation is at least one of a carbon-carbon double bond and a triple bond.

14. The coating material of claim 13, wherein the bond which can be activated with actinic radiation is a carbon-carbon double bond.

15. The coating material of claim 14, wherein the bond which can be activated with actinic radiation is contained in groups of the general formula I:

in which the variables have the following meanings:
R is a carbon-carbon single bond to the carbon atom of a carbonyloxy group or a divalent organic radical; and
$R^1$, $R^2$ and $R^3$ are each a hydrogen atom or an organic radical;
it being possible for at least two of the radicals R, $R^1$, $R^2$, and $R^3$ to be linked cyclically to one another.

16. The coating material of claim 1, wherein the compounds (b1) and (c1) are selected from the group consisting of carboxylic esters of the general formula II:

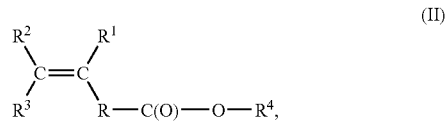

in which the variables R, $R^1$, $R^2$, and $R^3$ are as defined above and the variable $R^4$ stands for a hydroxyl-containing monovalent organic radical.

17. The coating material as set forth in claim 16, wherein the monovalent organic radical $R^4$ comprises or consists of at least one radical which is selected from the group consisting of hydroxyl-containing alkyl, cycloalkyl, and aryl radicals.

18. The coating material of claim 13, wherein the group which can be activated with actinic radiation is a (meth) acrylate group.

19. The coating material of claim 13, wherein the compounds (b1) and (c1) are selected from the group of hydroxyalkyl (meth)acrylates.

20. The coating material of claim 1, comprising at least one additive (E).

21. The coating material of claim 20, wherein the additive (E) is selected from the group consisting of polyphosphoric acid, dryers, organic and inorganic, colored and achromatic, optical effect, electrically conductive, magnetically shielding, and fluorescent pigments other than the pigments (D), transparent and opaque, organic and inorganic fillers, nanoparticles, oligomeric and polymeric binders other than the constituents (A), UV absorbers, light stabilizers, free-radical scavengers, photoinitiators, devolatilizers, slip additives, polymerization inhibitors, defoamers, emulsifiers and wetting agents other than the constituents (C), adhesion promoters, leveling agents, film formation auxiliaries, rheology control additives, and flame retardants.

22. A process for preparing a coating material of claim 1 by mixing its constituents and homogenizing the resulting mixture, which comprises
   (1) mixing at least one pigment (D) with a portion of at least one ester (B), at least one ester (C), water, and a portion of the constituent or constituents (A) and grinding the resultant mixture in a milling apparatus to give a pigment dispersion (1),
   (2) mixing a further portion of the constituent or constituents (A) and a further portion of at least one ester (C) with one another and homogenizing the resulting mixture to give the makeup mixture (2), and
   (3) then mixing the pigment dispersion (1) and the makeup mixture (2) with one another and homogenizing the resulting mixture to give the coating material (3).

23. The process of claim 22, wherein the pigment dispersion (1) and the makeup mixture (2) are mixed with one another in a proportion of 3:1 to 0.33:1.

24. The process of claim 22, wherein, for preparing the pigment dispersion (1), use is made as constituents (A) of at least one alkyd resin and at least one low molecular mass organic compound.

25. The process of claim 22 wherein, for preparing the makeup mixture (2), use is made as constituents (A) of at least one alkyd resin, at least one low molecular mass organic compound, and at least one oligomeric or polymeric organic compound.

26. The process of claim 22, wherein the pigment dispersion (1) and the makeup mixture (2) are prepared using at least one additive (E).

27. The process of claim 26, wherein, for preparing the pigment dispersion (1), use is made as additives (E) of at least one emulsifier which is different from the ester (C) or one non-(C) wetting agent and also at least one kind of nanoparticles.

28. The process of claim 26, wherein polyphosphoric acid, at least one photoinitiator, and at least one dryer are used as additives (E) for preparing the makeup mixture (2).

29. A coil coating comprising the coating material of claim 1.

30. The coil coating of claim 29 comprising a firmly adhering corrosion-inhibiting primer coating.

* * * * *